United States Patent [19]

Brubaker

[11] 4,118,043
[45] Oct. 3, 1978

[54] SLED ROLLER DEVICE

[75] Inventor: Charles W. Brubaker, Beaver, Pa.

[73] Assignee: The Raymond Lee Organization, Inc., New York, N.Y. ; a part interest

[21] Appl. No.: 806,951

[22] Filed: Jun. 15, 1977

[51] Int. Cl.² ............................................. B62B 13/18
[52] U.S. Cl. ........................................... 280/8; 16/30
[58] Field of Search .......................... 280/8, 10; 16/30

[56] References Cited
U.S. PATENT DOCUMENTS

| | | | |
|---|---|---|---|
| 1,412,413 | 4/1922 | Meyer | 280/8 |
| 1,947,154 | 2/1934 | Fox | 280/8 |
| 2,236,331 | 3/1941 | Cofsky | 280/8 |

Primary Examiner—Robert R. Song
Attorney, Agent, or Firm—Daniel Jay Tick

[57] ABSTRACT

A bracket has symmetrical halves having indentations formed therein for accommodating the runner of a sled. The halves have transverse bores formed therethrough for accommodating a bolt for affixing them to each other on opposite sides of the runner. The lower parts of the halves are spaced from each other for rotatably accommodating a roller therebetween.

1 Claim, 3 Drawing Figures

SLED ROLLER DEVICE

BACKGROUND OF THE INVENTION

The present invention relates to a sled roller device. More particularly, the invention relates to a sled roller device for affixing a roller to the runner of a sled to permit use of the sled on a surface having a high coefficient of friction.

Objects of the invention are to provide a sled roller device of simple structure, which is inexpensive in manufacture, removably affixed to a sled with facility, convenience, rapidity and safety, and functions efficiently, effectively and reliably to provide complete mobility to the sled, for as long as desired, on any surface.

BRIEF DESCRIPTION OF THE DRAWINGS

In order that the invention may be readily carried into effect, it will now be described with reference to the accompanying drawings, wherein:

FIG. 1 is a perspective view of a pair of the sled roller devices of the invention mounted on a sled;

DETAILED DESCRIPTION OF THE INVENTION

Figure 2:
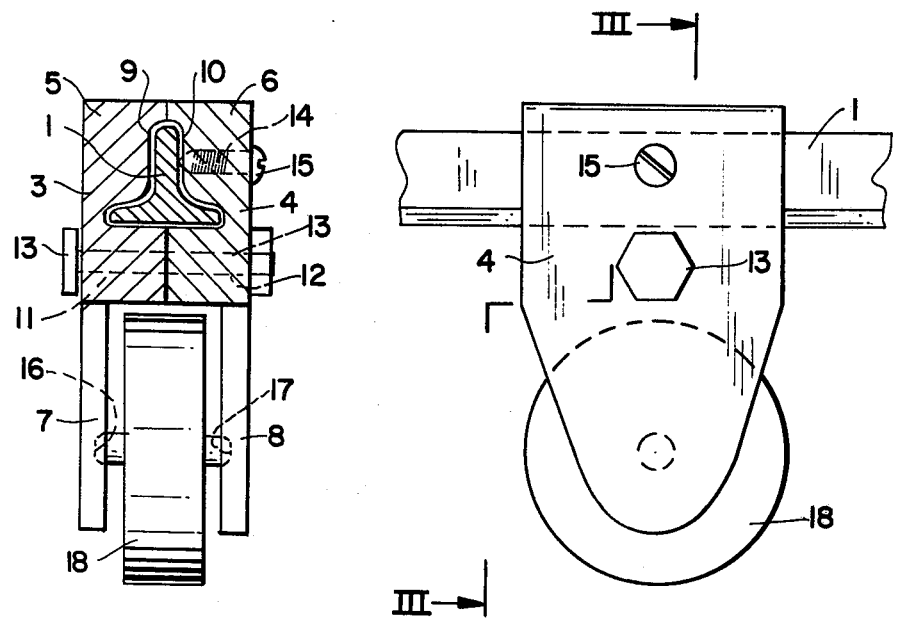
FIG. 2 is a side view, on an enlarged scale, of an embodiment of a sled roller device of the invention.

The sled roller device of the invention affixes a roller to a runner 1 (FIGS. 1 to 3) of a sled 2 (FIG. 1) to permit use of the sled on a surface having a high coefficient of friction such as, for example, concrete, earth, asphalt, and the like.

Figure 3:
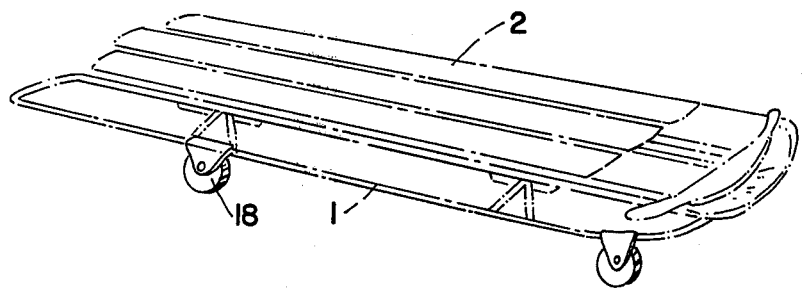
FIG. 3 is a view, partly in section, taken along the lines III—III, of FIG. 2.

The sled roller device of the invention comprises a bracket having a pair of symmetrical halves 3 and 4 (FIG. 3). As shown in FIG. 3, the halves 3 and 4 have upper parts 5 and 6, respectively, and lower parts 7 and 8, respectively. Indentations 9 and 10 are formed in the upper parts 5 and 6, respectively, for accommodating the corresponding halves of the cross-sectional area of the runner 1 of the sled, as shown in FIG. 3.

The halves 3 and 4 have transverse bores 11 and 12, respectively, formed therethrough in the upper parts 5 and 6 thereof, in alignment with each other, and spaced beneath the indentations 9 and 10, as shown in FIG. 3, for accommodating a bolt 13. The bolt 13 affixes the halves 3 and 4 of the bracket to each other at opposite sides of the runner 1 of the sled, as shown in FIG. 3.

The half 4 has a second transverse bore 14 formed therethrough and opening into the indentation 10 thereof for accommodating a set screw 15. The set screw is used to tighten the bracket in position at a desired point along the length of the runner. The lower parts 7 and 8 of the halves 3 and 4, respectively, are spaced from each other and have indentations 16 and 17, respectively, formed therein in alignment facing each other, as shown in FIG. 3.

The set screw 15 is threadedly coupled in the second bore 14 of the half 4.

A roller 18 (FIGS. 2 and 3) is rotatably mounted in the indentations 16 and 17 of the lower parts 7 and 8, respectively, of the halves 3 and 4 of the bracket.

The bolt 13 is accommodated in the aligned bores 11 and 12 formed through the halves 3 and 4 for affixing halves to each other on opposite sides of the runner 1 with the runner accommodated in the identations 9 and 10 of the upper parts 5 and 6 of said halves.

While the invention has been described by means of a specific example and in a specific embodiment, I do not wish to be limited thereto, for obvious modifications will occur to those skilled in the art without departing from the spirit and scope of the invention.

I claim:

1. A sled roller device for affixing a roller to a runner of a sled to permit use of the sled on a surface having a high coefficient of friction, said sled roller device comprising a bracket having a pair of symmetrical halves each having an upper part and a lower part with an indentation formed in the upper part for accommodating half the cross-sectional area of the runner of a sled, each of the halves having a transverse bore formed therethrough in the upper part thereof in alignment with the other spaced beneath the indentation thereof and one of the halves having a second transverse bore formed therethrough and opening into the indentation thereof, the lower parts of the halves being spaced from each other and having indentations formed therein in alignment facing each other;

a set screw threadedly coupled in the second bore of the one of the halves for tightening the bracket in position;

a roller rotatably mounted in the indentations of the lower parts of the halves; and a bolt accommodated in the aligned bores formed through the halves for affixing the halves to each other on opposite sides of the runner with the runner accommodated in the indentations of the upper parts of the halves.

* * * * *